Figure 1:
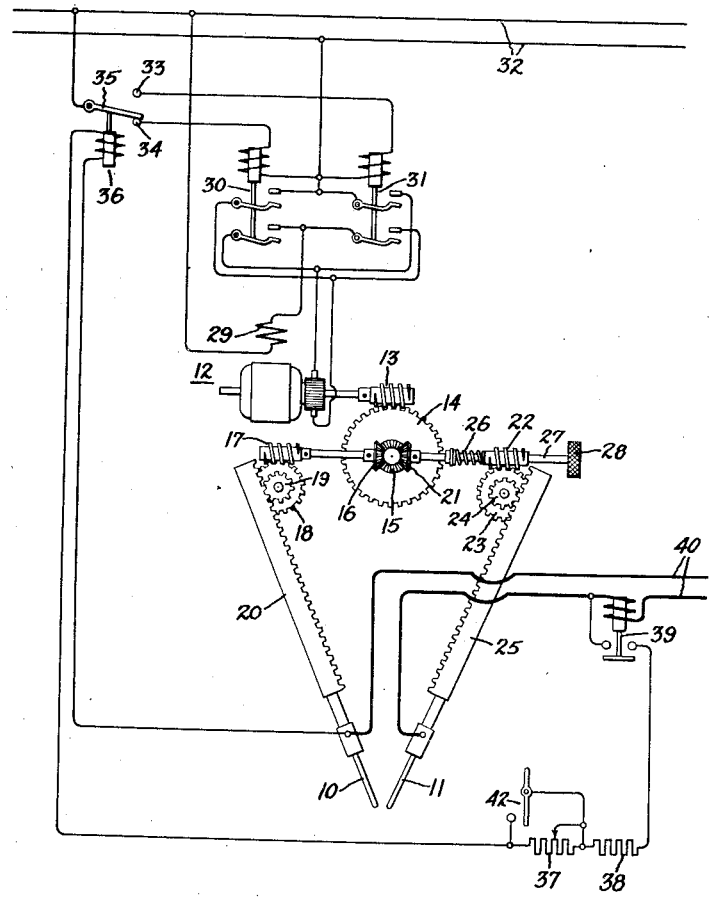

Oct. 3, 1939.  L. JONES  2,175,026

FUSION WELDING

Filed June 13, 1938

Inventor:
Leonard Jones,
by Harry E. Dunham
His Attorney.

Patented Oct. 3, 1939

2,175,026

UNITED STATES PATENT OFFICE 2,175,026

FUSION WELDING

Leonard Jones, Davyhulme, England, assignor to General Electric Company, a corporation of New York Application June 13, 1938, Serial No. 213,491
In Great Britain June 17, 1937

3 Claims. (Cl. 219—8)

My invention relates to fusion welding, and more particularly to that form of electric fusion welding known as atomic hydrogen welding.

In atomic hydrogen welding, the fusion of the work parts is accomplished through the agency of a "flame" of atomic hydrogen. This "flame" results from the recombination of atomic hydrogen to form molecular hydrogen which occurs with the release of a great amount of heat. Atomic hydrogen may be generated by dissociating hydrogen or a gas containing hydrogen through the agency of an electric arc across which the gas is directed. By controlling the energy of the arc by regulating its length and voltage, the amount of atomic hydrogen generated may be controlled and thus the heat available for welding may be controlled.

While my invention will be described in connection with a novel atomic hydrogen welding system, it is to be understood that as a method of welding it is applicable to any form of fusion welding.

When fusion welding butt or edge joints, it is the present practice to maintain the amount of heat available in the welding zone as constant as possible along the whole length of the joint so that the fusion of the metal parts at the joint will be uniform along the whole length of the joint. This is usually effected in atomic hydrogen welding by maintaining the arc voltage constant assuming, of course, uniform speed of travel and spacing of the welding electrodes along and from the joint as well as uniform arc current and uniform flow of gas to the arc region.

It has been observed, however, that when the available heat in the welding region remains unchanged throughout the whole length of the joint, there is a tendency for the molten metal of the joint, possibly due to surface tension, to leave the finishing end of the joint and flow back toward the middle of the joint, thus leaving a groove at the finishing end.

It is an object of my invention to eliminate this groove at the end of a fusion welded joint by providing a method of welding in which a substantially constant amount of heat is supplied along the length of the joint until the weld approaches the end of the joint when the heat is reduced sufficiently to complete the weld without having the molten metal at the end of the joint flow back toward the middle of the joint.

It is a further object of my invention to provide a control system for electric fusion welding by means of which my above described method may be performed automatically.

My invention will be better understood from the following description taken in connection with the accompanying drawing and its scope will be pointed out in the appended claims.

Figure 2:
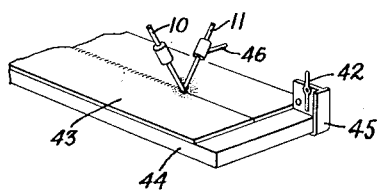

In the drawing, Fig. 1 is a diagrammatic illustration of an atomic hydrogen welding system embodying my invention; and Fig. 2 is a fragmentary view illustrating one manner in which a limit switch forming part of the system may be employed for securing reduced heating at the end of a welding operation.

In atomic hydrogen welding, atomic hydrogen is generated by an instrumentality usually referred to as a welding head. The atomic hydrogen welding head illustrated in Fig. 1 may be of the type described and claimed in United States Letters Patent 1,946,305, James T. Catlett, February 6, 1934. This head comprises electrodes 10 and 11 which are fed toward and away from one another by a feed motor 12 to maintain between their arcing terminals an arc across which hydrogen or a hydrogen containing gas is supplied (by a means not illustrated) to be dissociated in the arc for the formation of atomic hydrogen. Electrode 10 is fed by motor 12 through worm 13, worm wheel 14, bevelled gears 15 and 16, worm 17, worm wheel 18, gear 19 and rack 20; and electrode 11 is fed by the same motor through worm 13, worm wheel 14, bevelled gears 15 and 21, worm 22, worm wheel 23, gear 24 and rack 25. Normally, bevelled gear 21 is forced into engagement with bevelled gear 15 by means of a spring 26 compressed between a collar on shaft 27 and the worm 22, but this driving connection may be interrupted by withdrawing gear 21 from mesh with gear 15 through the agency of knob 28 attached to shaft 27. The worm 22 is splined on the shaft 27 to which gear 21 and knob 28 are attached so that this disengagement may readily be accomplished without rotating worm 22. When gears 21 and 15 are thus disengaged, the electrode 11 may be adjusted independently of electrode 10 by turning the knob 28. However, when gears 21 and 15 are in mesh, both electrodes 10 and 11 are simultaneously fed at the same rate by feed motor 12 through the gearing just described. The independent control of electrode 11 through the agency of knob 28 thus enables the welding operator to adjust the electrodes relatively to one another if for any reason they are consumed in the welding arc at unequal rates.

The armature of the electrode feed motor 12 is connected in series with its field 29 through the contacts of reversing contactors 30 and 31 to a source of supply 32. The operating coils of contactors 30 and 31 are connected through the contacts 33, 34 and 35, of a voltage relay 36 to the same source of supply 32. The operating winding of voltage relay 36 is connected across the electrodes 10 and 11 through an adjustable resistance 37, a fixed resistance 38, and the contacts of a relay 39. The operating coil of relay 39 is connected in series with an arcing circuit 40 through which power is supplied for maintaining an arc between the electrodes 10 and 11.

The adjustable resistance 37 in circuit with the operating winding of the voltage relay 36 is shunted by a limit switch 42. This limit switch may be attached to the work 43 or the work support 44 by a suitable clamp 45 so that its operating member is in the path of travel of a projecting member 46 attached to the welding head embodying electrodes 10 and 11. Any other means may be employed for positioning the limit switch 42 so that the relative movement of the welding head and the work produces a closure of this switch near the end of the joint being welded. In fact, if an automatic system is not desired, switch 42 may be located in any convenient position and closed manually by the welding operator.

The system above described operates as follows: When an arc is established between the electrodes 10 and 11 by bridging their arcing terminals with a piece of carbon or by manually feeding the electrodes toward one another until their arcing terminals engage one another, the flow of current through the operating winding of relay 39 closes its contacts thus connecting the operating winding of voltage relay 36 through resistors 37 and 38 across the arc between electrodes 10 and 11. Relay 36 will thus be responsive to arc voltage and will, during welding, normally assume the mid or "off" position. If, however, the voltage of the arc between the electrodes 10 and 11 exceeds a predetermined upper limit, voltage relay 36 will complete a circuit through its contacts 35 and 33 to energize the operating winding of contactor 31 which will close its contacts and connect the electrode feed motor 12 to the source of supply 32 for rotation in the proper direction to feed the electrodes 10 and 11 toward one another and thus reduce the arc voltage. On the other hand, if the voltage of the arc falls below a predetermined lower limit, voltage relay 36 will complete a circuit through its contacts 34 and 35 to energize the operating winding of contactor 30 which will close its contacts and connect motor 12 to the source of supply 32 for rotation in the opposite direction to feed the electrodes 10 and 11 away from one another and thus increase the arc voltage. Thus, through the operation of voltage relay 36 a substantially constant arc voltage is maintained between electrodes 10 and 11. This substantially constant arc voltage develops a substantially constant amount of energy which is available for generating atomic hydrogen and the welding operation will, consequently, proceed with a substantially constant amount of heat supplied by the atomic hydrogen to the point of welding.

Near the end of the welding operation, however, the relative movement of the welding head and work will produce a closure of limit switch 42. The closure of this switch will short circuit the adjustable resistance 37 in circuit with the operating winding of voltage relay 36 and cause it to function in a manner to maintain a lower arc voltage between the electrodes 10 and 11 which in turn will result in less heating at the point of welding due to the reduced energy of the arc and consequent reduction of atomic hydrogen generated. The lower operating voltage of the arc will depend mainly upon the value of resistance 38 which may be made adjustable to provide an adjustment of this lower operating voltage. Thus, for example, supposing the arc between electrodes 10 and 11 is normally maintained at a voltage between 60 and 85 volts, the closure of limit switch 42 may lower the arc voltage to a range of 30 to 35 volts.

As explained above, the arrangement is such that the reduced arc voltage, obtained when the limit switch 42 is closed, sufficiently reduces the heating of the metal and its fluidity at the end of a joint to prevent molten metal flowing back along the weld to any noticeable extent. It has been found that a suitable point at which to close the limit switch 42 is when the electrodes are positioned between a quarter and a half inch from the end of the joint being welded.

Although my invention has been described in connection with a control for atomic hydrogen welding, it is apparent that as a method of fusion welding it is not limited thereto. Fusion welding is performed by electric arcs as well as by gas flames. In atomic hydrogen welding both an electric arc and a gas flame are instrumentalities in the welding operation and, consequently, the performance of my method of welding by means of atomic hydrogen serves to illustrate its application in both fields of fusion welding.

Furthermore, the system illustrated for automatically performing my method of welding may be variously modified to meet conditions encountered in performing various welding operations.

I, therefore, aim in the appended claims to cover all modifications of my invention which fall within its true spirit and scope.

What I claim as new and desire to secure by Letters Patent of the United States is:

1. Apparatus comprising a welding agency including arc supporting electrodes, means for traversing the arcing terminals of said electrodes and a seam to be welded relatively to one another, means for maintaining an arc between the arcing terminals of said electrodes, and means responsive to the voltage of said arc for maintaining a substantially constant predetermined spacing between the arcing terminals of said electrodes until they approach the end of said seam and for reducing the spacing of the arcing terminals of said electrodes during the final portion of their travel along said seam.

2. Apparatus comprising a welding agency including arc supporting electrodes, means for traversing the arcing terminals of said electrodes relatively to and at a substantially constant distance from a seam to be welded, means for maintaining an arc between the arcing terminals of said electrodes, means responsive to the voltage of said arc for maintaining according to its settings a plurality of predetermined spacings of the arcing terminals of said electrodes, and means responsive to the traversing movement between said electrodes and said seam for changing the setting of said voltage responsive means and consequently the spacing of the arcing terminals of said electrodes at a predetermined point in said traversing movement.

3. The method of welding seam joints by an atomic hydrogen process which comprises causing the electrodes of the atomic hydrogen welding agency to travel progressively along the seam at a substantially constant distance therefrom, controlling the distance apart of said electrodes so as to maintain the arc voltage substantially constant until said electrodes reach a point approaching the end of their path of travel along said seam, and moving said electrodes relatively near together during the remainder of their travel along said seam to reduce the heating sufficiently along that part of the seam which is welded last to prevent molten metal running back any substantial amount from the end of the seam toward the middle of the seam.

LEONARD JONES.